C. S. HOFFMAN.
TRAILER.
APPLICATION FILED OCT. 16, 1920.

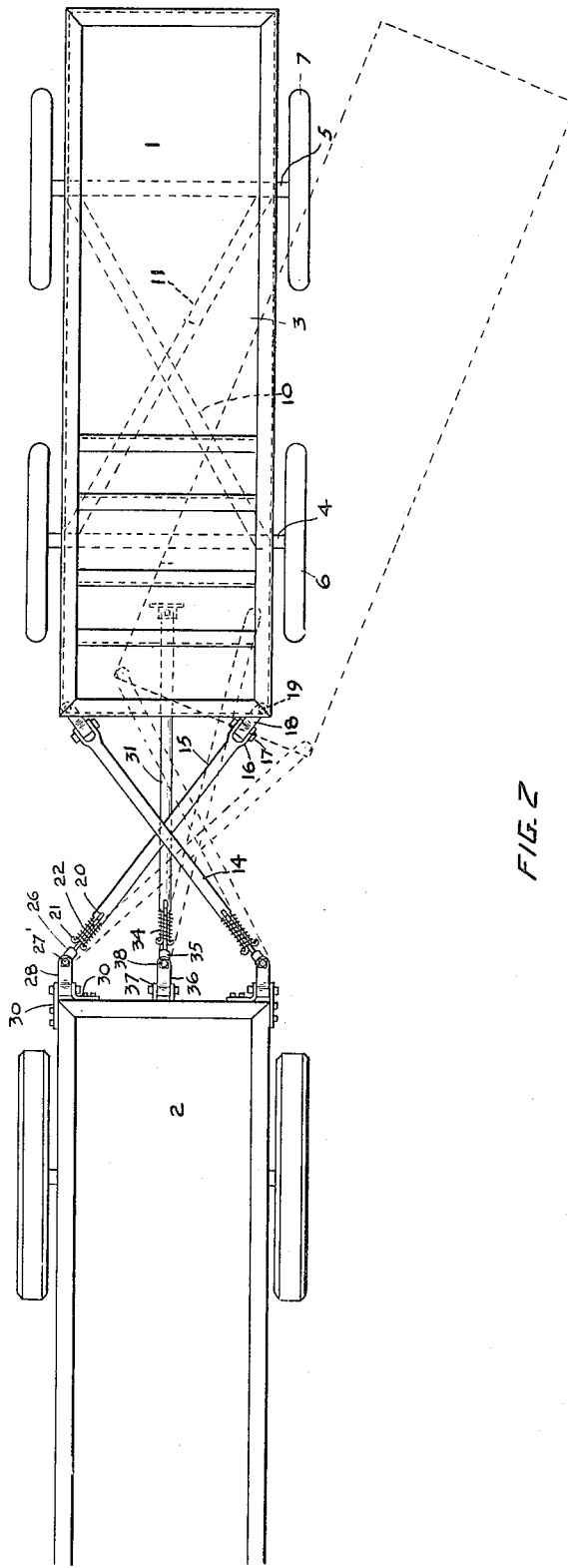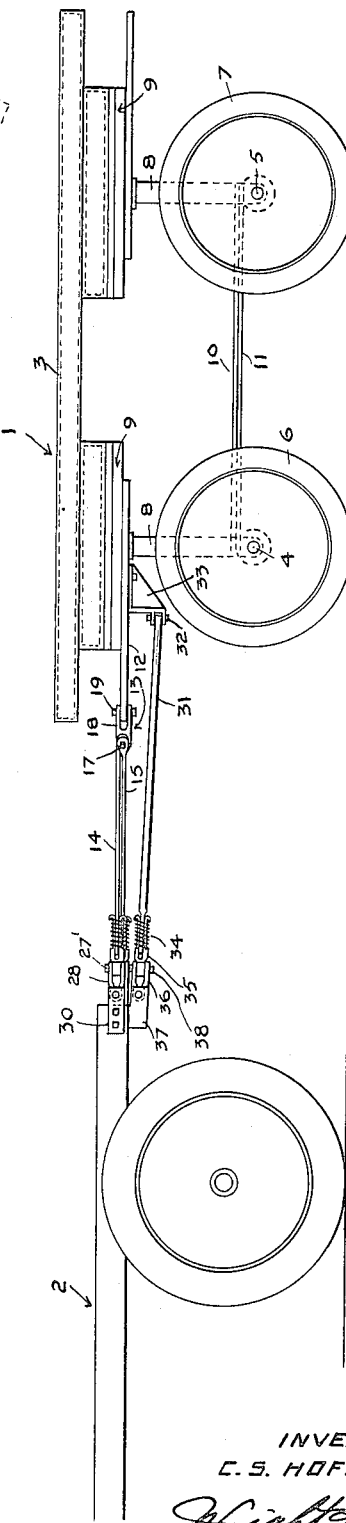

1,429,734.

Patented Sept. 19, 1922.
2 SHEETS—SHEET 2.

INVENTOR
C. S. HOFFMAN
BY
ATT'YS.

Patented Sept. 19, 1922.

1,429,734

UNITED STATES PATENT OFFICE.

CHARLES S. HOFFMAN, OF SAN FRANCISCO, CALIFORNIA.

TRAILER.

Application filed October 16, 1920. Serial No. 417,331.

*To all whom it may concern:*

Be it known that I, CHARLES S. HOFFMAN, a citizen of the United States, residing at San Francisco, in the county of San Francisco and State of California, have invented new and useful Improvements in Trailers, of which the following is a specification.

The present invention relates to improvements in trailers for motor vehicles and has particular reference to improved steering and coupling means which will operate to prevent side sway of the trailer, cause the trailer to closely follow the movements of the towing vehicle and permits of the turning of the trailer in a short radius.

One of the objects of the invention is to provide a simple, strong, and safe coupling device which will yield sufficiently under shock and strains brought about incident to sudden starting and stopping of the towing vehicle to prevent breaking or any derangement of the coupling, and eliminate sudden jarring of the trailer or towing vehicle.

A further object is to generally improve and simplify the construction of vehicle trailers so as to render them more safe and reliable as to use and to provide for an easy handling and controlling of the movements thereof.

The invention possesses other advantages and features, some of which, with the foregoing, will be set forth at length in the following description wherein I shall outline in full that form of the invention which I have selected for illustration in the drawings accompanying and forming a part of the present specification. In said drawings, I have shown one form of the construction of my invention, but it is to be understood that I do not limit myself to such form since the invention as expressed in the claims may be embodied in a plurality of forms.

Referring to the drawing:

Figure 1 is a top plan view of a trailer constructed in accordance with my invention, showing the same attached to a truck and in certain of its positions, in dotted lines.

Figure 2 is a side elevation of the trailer and part of the truck.

Figure 3:
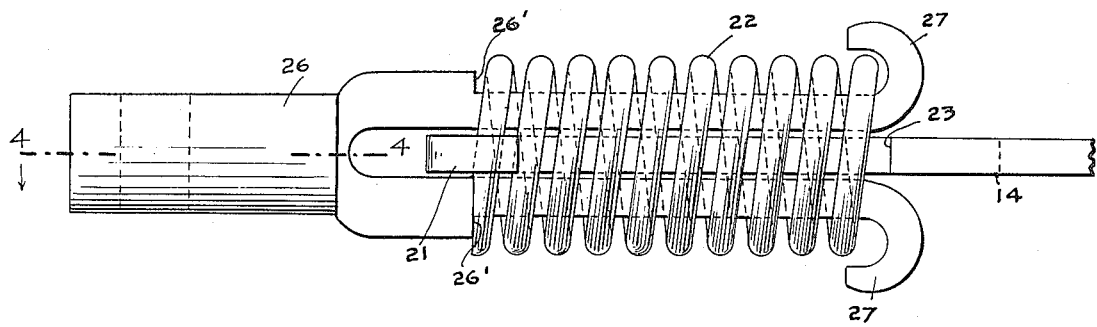
Figure 3 is a fragmentary enlarged top plan view of one of the coupling elements.

In the embodiment of this invention disclosed in the accompanying drawings, I provide a trailer 1 which is to be coupled with a motor truck 2.

The trailer 1 embodies a body 3, axles 4 and 5, and front and rear wheels 6 and 7. The axles are connected by upright members 8 with suitable fifth-wheel construction 9, whereby the axles may be turned so as to effect the proper steering of the trailer. To provide for a short turning action, crossed steering rods 10 and 11 are each suitably pivoted at their ends to points adjacent the outer ends of the axles. With this arrangement, when the front wheels are turned to the right, the rear wheels are turned to the left, and the short turning action is provided in this way. The trailer is otherwise constructed in the usual manner.

Attached to the member 8 for the front axle 4 is a rectilinear plate member 12 which is about the same width as, and projects forwardly parallel to the body 3. This member turns with the member 8 and front axle and constitutes a connecting means for a coupling device 13.

The coupling device comprises two crossed rods 14 and 15 with their rear ends forked as at 16 and pivoted as at 17 to clevises 18 which latter are pivoted as at 19 to the forward corner portions of the plate 12. These connections provide for vertical and lateral movement of said rods relative to the plate 2.

Figure 4:
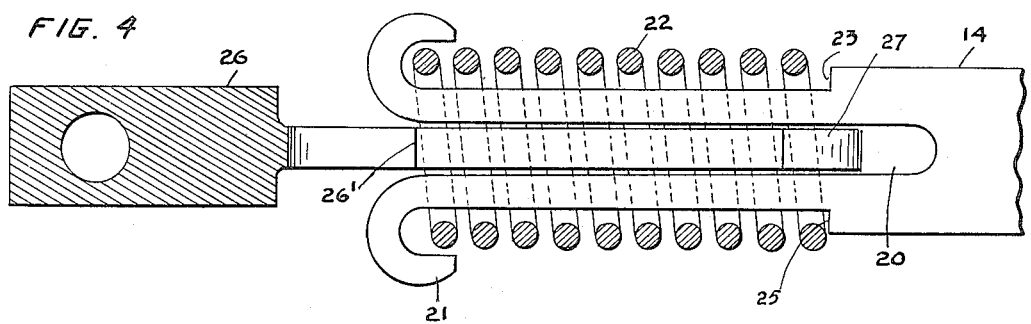
Figure 4 is a side elevation, partly in section, of the element shown in Figure 3.
Figure 5:
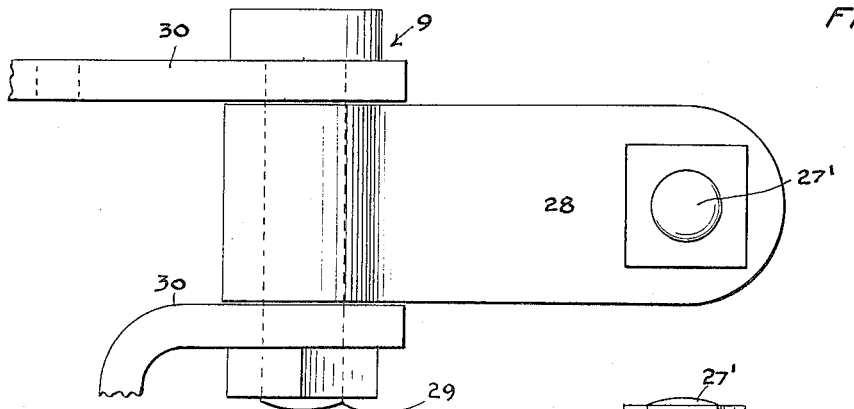
Figure 5 is an enlarged top plan view of one of the coupling links.
Figure 6:
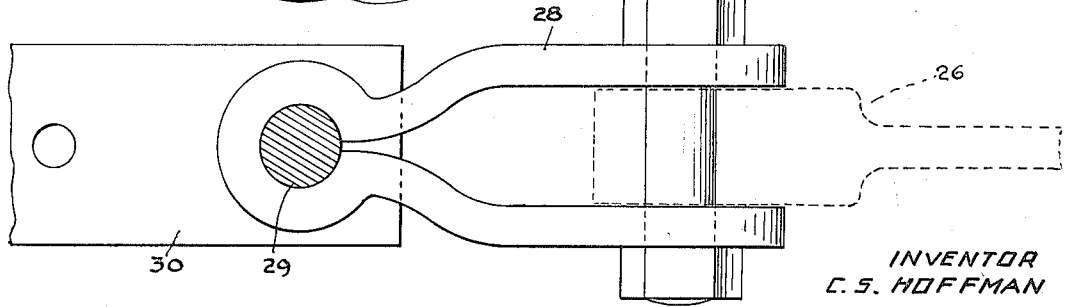
Figure 6 is a side elevation of the coupling links.

The forward ends of the rods 14 and 15 are each slotted as at 20 and provided with up-turned lugs 21 on opposite sides of the open end of the slot. A helical expansion spring 22 surrounds the slotted portion of each rod and at its forward end abuts the lugs 21. Shoulders or abutments 23 are provided on each rod at a point spaced forwardly from the inner end of the slot and the other end of the spring abuts these shoulders. The shoulders or abutments may be formed by reducing the rod at its outer end, as shown in Figure 4 at 25. Short connecting bars 26, slotted as are the bars 14 and 15 are interfitted with the rods 14 and 15 and overlap said rods so as to be surrounded by the springs. The bars have outwardly turned lugs 27 on their rear ends. These lugs project at right angles to the lugs 21 and abut the rear ends of the springs.

Both lugs 21 and 27 are curved so as to hook over the respective ends of the springs and thus hold the springs in place on the rods 14 and 15. The bars 26 have abutments 26' therein engaging the outer ends of the springs 22. The forward ends of the bars 26 are pivotally connected by vertical and removable pivot pins 27' with clevises 28 which latter are pivoted as at 29 to brackets 30 fixed to the rear corner portions of the frame of the truck 2. By this slidable interfitting of the rods 14 and 15, and bars 26, the springs are compressed upon longitudinal movement of said bars and rods, in either direction, whereby a cushioning or yielding action is provided and will relieve the parts of shocks and strains occurring incident to sudden stopping and starting of the truck 2.

In addition to the rods 14 and 15 and bars 26, I provide a draw bar 31 which is pivoted as at 32 to a bracket 33 fixed to and near the center of the plate 12 under said plate and in line with longitudinal center line of the trailer and truck. The other end of the draw bar is constructed identically with the outer ends of the rods 14 and 15 and supports an expansion spring 34. A connecting member 35 is pivoted to a clevis 36, which is in turn pivoted to a bracket 37 located centrally of and upon the rear end of the truck. This member 35 is of the same construction as one of the bars 26 and is likewise associated with the bar 31 and spring 34. This bar may be disconnected by removing the pivot pin 38 which connects the member 35 with the clevis 36. The bars 14 and 15 are disconnected by removing the pins 27'. Other means may be provided if desired for facilitating the coupling and uncoupling of the trailer.

*Operation.*

When the truck turns to the left, the crossed rods 14 and 15 swing so as to move the plate 12 to the right. This rotates the member 8 and moves the axle 4 so that the wheels 6 of the trailer are turned to the right. This movement of the front wheels, causes the crossed rods 10 and 11 to turn the rear wheels to the left. This provides for a short turning movement of the trailer and causes the trailer to closely follow the movement of the truck.

The springs 22 and 34 cushion the jerking strains occasioned in starting and stopping.

I claim:

1. A trailer comprising a body, front and rear wheels supporting the body and mounted so as to be turned to right and left, means of connection between said wheels for turning the rear wheels in opposite direction from the front wheels, a member arranged to turn with the front wheels, cross coupling rods pivoted to said member, and means for connecting the last-named rods with the vehicle, and compression springs operatively associated with the last-named rods and arranged to compress under longitudinal strains transmitted in either direction to said last-named rods.

2. A trailer comprising a body, front and rear axles connected with said body so as to be turned to right or left, wheels mounted on said axle, crossed steering rods pivotally connected at their ends with the end portions of the axle, a plate beneath said body and connected with said front axle so as to move therewith, crossed coupling rods pivoted at the opposite points of said plate, springs surrounding said coupling rods adjacent to their forward ends, oppositely facing abutments on said coupling rods with which the ends of the springs contact, connecting bars overlapping the outer ends of the coupling rods and being surrounded by said springs, abutments on said connecting bars with which opposite ends of the springs engage and means for connecting said connecting bars with a vehicle.

3. A trailer comprising a body, front and rear wheels supporting the body and mounted so as to be turned to right and left, means of connection between said wheels for turning the rear wheels in opposite direction from the front wheels, a member arranged to turn with the front wheels, cross coupling rods pivoted to said member, and means for connecting the last-named rods with the vehicle, and a draw bar having one end pivoted to said plate at a point rearward of the connections of the coupling rods with said plate, and means for connecting the other end of the draw bar with the vehicle.

CHARLES S. HOFFMAN.